Feb. 16, 1932.    O. R. BRINEY    1,845,122
MACHINING METHOD
Filed Feb. 7, 1928
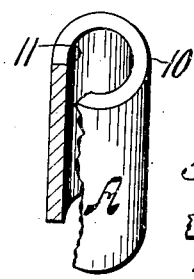
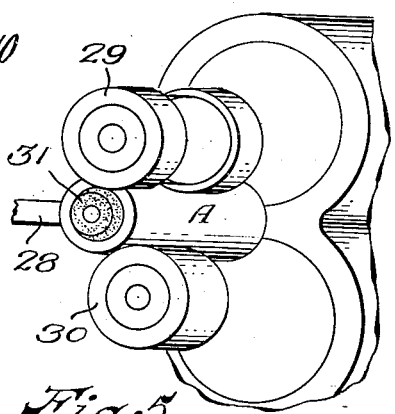
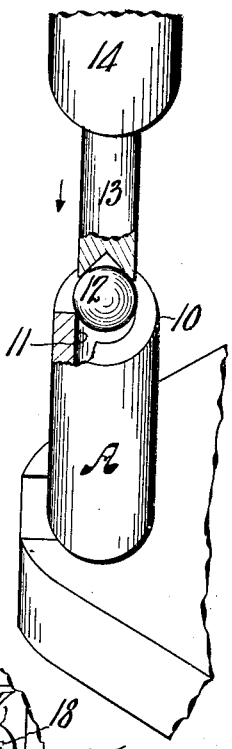
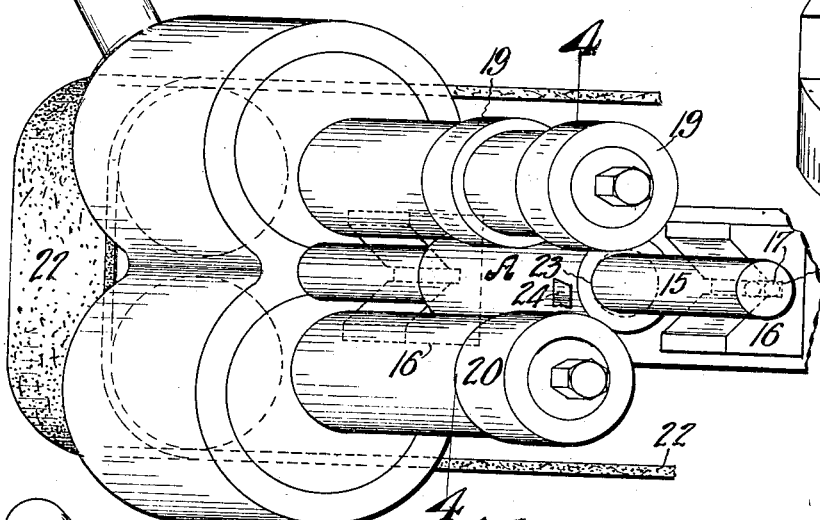
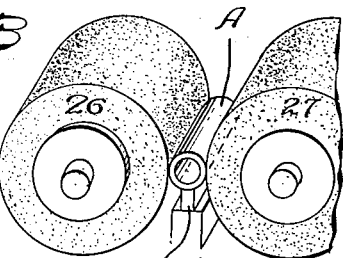
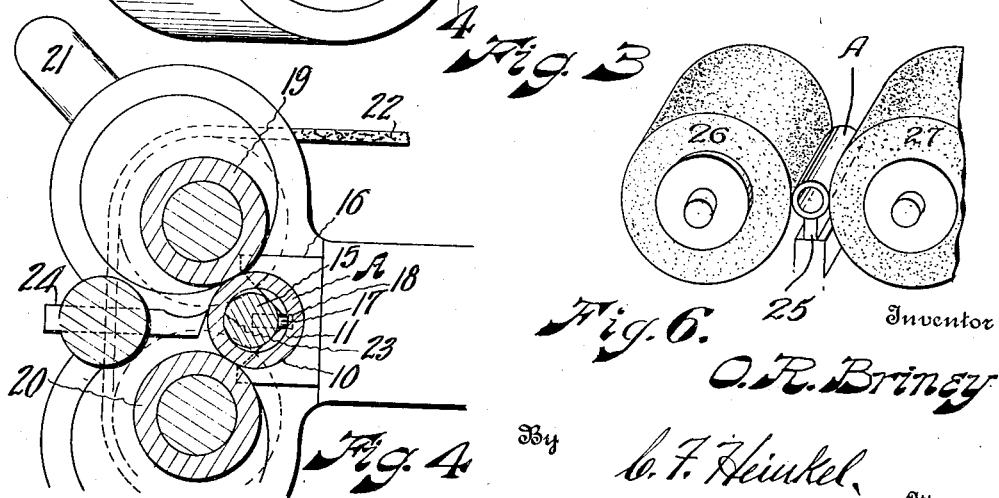
Inventor
O. R. Briney
By C. F. Heinkel
Attorney Patented Feb. 16, 1932

1,845,122

UNITED STATES PATENT OFFICE

OTTIS R. BRINEY, OF PONTIAC, MICHIGAN

MACHINING METHOD

Application filed February 7, 1928. Serial No. 252,545.

My invention relates to methods for machining articles generally and more particularly to methods for machining tubular articles.

The main object of my invention is to provide a method whereby an article can be machined in the most economical manner and with machined surfaces true with each other. Other objects will appear, or become apparent or obvious, or will suggest themselves upon an inspection of the accompanying drawings and in the following description of the device shown in the drawings and the method inherent therein.

In many articles it is quite desirable, and in many cases very necessary, that different surfaces thereof are machined true with other surfaces thereof. In tubular articles, such as bushings for instance, it is quite desirable that the hole therein or the inner surface thereof is true with the outside or outer surface thereof.

My invention aims to provide a method for machining surfaces true with each other and to do that most quickly, with the least amount of effort, and with the least quantity of apparatus or tools.

Generally speaking:—My invention uses one surface of an article to guide the article while a machining operation is being performed on another surface of the same article and first forms the article in the rough to allow for subsequent finishing or sizing; then sizes the hole or inner surface either to finish size or to finishing size to allow for finish sizing and, preferably, uses a solid device to effect this sizing most economically; then finish the outer surface by rotating the article and holding the same only sidewise against a guide which extends through the hole of the article so that the article is guided on the guide by means of the inner surface only and therefore is guided by the contour of the inner surface; then finish the inner surface if desired while the article is guided by the outer surface.

With my method, each surface is machined while the article is accurately guided by a surface which should be true with that surface; therefore, these surfaces so machined must be true with each other after they are machined and this true machining is effected without arbors or other center mounted devices and without collets or chucks or other gripping devices. The article always rotates freely and naturally and is not affected by gripping which may distort it while it is being gripped, or distorted by other means, and therefore be out of true when the gripping or other distorting effect is released nor by centers or gripping or similar devices being out of true. It is well known that centers and gripping and similar devices can not be depended upon to be true; they will not remain true even if they are made true in the first place. The surfaces machined according to my invention on one article will always be true with each other since my invention eliminates all elements which might affect the article disadvantageously and uses only the surfaces, previously machined or otherwise, on the same article to guide it while a machining operation is being performed on another surface thereof.

I am aware that various devices can be designed to carry out my method. In order to present an example of such a device and one particular manner of carrying out my method as related to this particular device, I have selected and have shown this device in the accompanying drawings but it is understood that the device so shown and the method inherent therein, and the following description thereof, are not intended as a limitation of my invention since I am aware that other devices or apparatuses can be used to carry out my method and variations can be made in the method described within the scope of the appended claims.

In the accompanying drawings mentioned:—

Fig. 1 is a general perspective view, partly in section of a round tubular bushing machined by a method according to features of my invention.

Fig. 2 is a general perspective view, partly in section of a device for performing a finishing or a sizing operation of the hole through the bushing of Fig. 1 by means of a ball, to size the hole according to features of my invention.

Fig. 3 is a general perspective view of a device or apparatus showing a plain arbor without centering means therein or thereon as a guide for the bushing and two rollers rotating the bushing as well as holding the same so that the inner surface thereof contacts only one side of the arbor and also showing a tool means to operate on the bushing while it is so rotated and held according to my invention.

Fig. 4 is a section taken on the line 4—4 of Fig. 3 and shows more clearly the relations between the bushing and the elements of the device or apparatus shown in Fig. 3.

Fig. 5 is a general perspective view of the operating portion of a device for machining inner surfaces of bushings while the same are guided by outer surfaces thereof.

Fig. 6 is a general perspective view of the operating portion of a device for machining outer surfaces of bushings while the same are guided by the same outer surfaces.

Similar reference characters refer to similar parts throughout the views.

The bushing A has the outer surface 10 and a hole through the same defining the inner surface 11 and is first rough formed by any suitable means such as an automatic machine or other machine or forging or casting or otherwise to a size sufficiently large to permit of machining thereof to reduce the bushing to required size.

The hole in the bushing is then machined either to finish size or to finishing size when a further machining operation is to be performed on the inner surface 11. The finish size mentioned here as well as later on in connection with the outer surface of the bushing is the final size of the bushing while the finishing size mentioned and to be mentioned is a size sufficiently large to permit of a final finishing operation. With my invention, this final finishing allowance can be much less than the usual allowance for such purposes since the surfaces are always guided by a companion surface.

Although broaches, reamers, or other tools of the same nature and import can be used to machine the hole, I prefer to use, and attain a decided advantage in time and accuracy by such use, a solid or burnisher like device for that purpose since such a device sizes more accurately, needs no sharpening, has no teeth to injure an operator, does not break easily, and, above all, intensifies the grain of the material of the bushing or surface 11 and thereby provides longer life for the bushing.

To further increase the economy in machining this bushing, I use the hardened and ground steel ball 12 as the machining or sizing or finishing element. It is well known that these balls are very inexpensive since they are made in quantities and by automatic machinery. Other devices can be used for this purpose such as burnishing tools for instance.

The machining or sizing or finishing element, the ball 12 in the present instance, is forced through the hole in the bushing A as shown in Fig. 2 by means of the pin 13 moved longitudinally in the direction of the arrow by the ram 14 moved by any suitable means such as an arbor press for instance until the ball is forced all the way through the bushing and thereby produces a straight hole having a smooth surface 11 with dense material. The hole is now the size of the ball minus whatever amount the material of the bushing contracts diametrically after the machining operation. When this operation is to be the final finish operation, the ball should be slightly larger in diameter than the final finish size of the hole to allow for the diametrical contraction mentioned. When a final finishing operation is to be performed on the inner surface 11, the ball can be of the same size as the final size of the hole since the final finish needs to remove only a very small amount of material according to my invention and the amount of contraction mentioned is usually sufficient to permit the final finishing of the surface 11.

When the bushing is to be hardened, the diametrical shrinkage of the bushing due to the hardening thereof will provide sufficient material usually to final finish the surface 11.

After the machining step of the hole the outer surface 10 is machined either to finish or to finishing size and my invention does this machining by rotating the bushing A while the same is guided by the surface 11 thereof as shown in Figs. 3 and 4 where the ends of the arbor 15, a solid and round element in this instance, not supported on centers and longitudinally movable, rests in the V blocks 16 and is held against rotation in the present instance by the pin 17 fixed in the arbor and extending into the groove 18 in the V blocks. The rollers 19 and 20, eccentrically mounted in the present instance to prevent the same from being moved by the bushing and and to permit the same to be moved toward and away from each other by means of the handle 21 to release and to engage the bushing and rotated by means of the belt 22 which is arranged to rotate the rollers as well as to normally tend to move the rollers toward each other with equal force, contact the bushing A equally and thereby not only retain the inner surface in accurate contact with the arbor at all times and rotate the same but also tend to move the same sidewise and in such a manner that the inner surface 11 contacts the side 23 of the arbor, in the present instance only a one line contact between the arbor and the surface 11, with clearance all around otherwise as seen more clearly in Fig. 4. The machining tool 24, a turning tool in the present instance, is fed over the surface 10 by any suitable means not shown in the drawings while the bushing is so rotating against one side of the arbor and is fed into the cut as deep as desired to reduce the external diameter of the bushing either to final size or to finishing size. Due to this one side contact between the arbor and the surface 11 while the surface 10 is being machined, the bushing is guided in such a manner that the contour of the surface 11 defines this guiding; therefore, the surfaces 10 and 11 will be true with each other after this machining operation.

When the bushing is so machined, the hole will be straight and true and have a smooth wall of intensified material and the outside or outer surface 10 will be accurately true with the surface 11, the wall of the bushing will be of even thickness all around, all of the machining is accomplished without any centering or gripping or other extraneous means, without any setting of the bushing, and without any apparatus or tool or device usable only on this particular bushing since the arbor, the only movable element, can be used for a very large number of bushings which have holes of different diameters or of different outside diameters.

When the bushing A is to be hardened, it is first rough formed as described above, the hole is then machined to finishing size as described above, the surface 10 is then machined to finishing size as described above, the bushing is then hardened and ground to finish size in a manner similar to the machining operations described above and explained more in detail below.

Since the wall of the bushing was machined of even thickness all around and the surfaces 10 and 11 are therefore true with each other, these two surfaces remained practically true with each other during the hardening operation; therefore, very little stock was needed or left for the final grinding of the bushing. Therefore, I next put the bushing into a centerless grinding machine, a machine which requires no centers to support the bushing, shown in Fig. 6 and described below, either of a special design or of a type or make now on the market and grind the surface 10 down to finish size. Even with this centerless grinding, the surfaces 10 and 11 will remain true because they were true before the grinding operation was performed and the bushing was not distorted by any gripping or similar means nor was it held or forced out of true by any centering means during the grinding operation.

A centerless grinding device, mentioned above, is illustratively shown in Fig. 6 wherein the bushing A is supported on the rest 25 while the grinding wheels 26 and 27, usually rotating at different speeds, machine the outer surface and also rotate the bushing between them and hold the same against the rest 25.

When the surface 11 is to be ground also, the bushing is placed into a machine or device illustratively shown in Fig. 5 wherein the bushing A is held sidewise in abutment on the positionally fixed guide 28 and is rotated by means of the rollers 29 and 30 mounted and operated similar to the rollers 19 and 20 in Fig. 3 while the grinding wheel 31 operates on the surface 11, or other device attaining the same result in which the surface 11 will be finished while the bushing is guided by the contour of the now ground surface 10 so that the surfaces 10 and 11 must be accurately true with each other and the wall of the bushing must be of even or equal thickness all around when these two grinding operations are performed in the manner described.

When the bushing is not to be hardened but is to be ground to size on either one or on both of the surfaces 10 and 11, the steps for machining the bushing are followed except that the bushing is not hardened.

For the purpose of the present invention, the sizing and the machining and the grinding are all to be considered as machining operations.

With the steps outlined above, a bushing can be made in the most economical manner, very low cost of production, no tools or devices are required for different sizes of bushings, one apparatus will answer for a very large number of different bushings, no skilled operator is required since there is no setting to be done, there is no gripping of the bushing which would distort the same, there are no centers to throw the bushing out of line, and the surfaces 10 and 11 will be absolutely true with each other on any number of bushings when the same are so machined and the production of the bushings is attained at the lowest possible cost.

The one line contact of the inner surface on the arbor at 23 can be changed to a multiple line contact or to a roller or other anti-friction contact but it is preferred that the contact of the inner surface on the guide for the bushing is located between the rollers and at one side of the same so that both rollers act to rotate the bushing as well as to keep the inner surface thereof against the guide which engages the inner surface at the highest point (23) so that the inner surface can not move out of longitudinal alignment with the guide and is further guided rotatively by the contour of the inner surface as the bushing is being rotated.

I am aware that variations can be made in the steps described herein within the scope of the appended claims; therefore, without limiting myself to the precise steps described nor to the precise order of the steps as described,

I claim:—

1. A machining method for a tubular article including rough forming said article, machining inner surface of said article, hardening said article, and machining outer surface of said article while the same is guided by the contour of said inner surface.

2. A machining method for a tubular article including rough forming said article, machining inner surface of said article by means of a non-cutting device, hardening said article, and finish machining outer surface of said article while the same is guided by means of the contour of said inner surface.

3. A machining method for a tubular article including rough forming said article, machining inner surface of said article, machining outer surface of said article to finishing size while the same is guided by the contour of said inner surface, and finish machining said outer surface while said article is guided by said outer surface.

4. A machining method for a tubular article including rough forming said article, machining inner surface of said article by means of a non-cutting device, machining outer surface of said article to grinding size while the same is guided by the contour of said inner surface, and finish grinding said outer surface while said article is guided by said outer surface.

5. A machining method for a tubular article including rough forming said article, machining inner surface of said article, machining outer surface of said article to grinding size while the same is guided by the contour of said inner surface, hardening said article, and finish grinding said outer surface while said article is guided by said outer surface.

6. A machining method for a tubular article including rough forming said article, machining inner surface of said article by means of a non-cutting device, machining outer surface of said article to finishing size while the same is guided by the contour of said inner surface, hardening said article, and finish grinding said outer surface while said article is guided by said outer surface.

7. A machining method for a tubular article including rough forming said article, machining inner surface of said article to finishing size, machining outer surface of said article to finishing size while the same is guided by the contour of said inner surface, finish machining said outer surface while said article is guided by said outer surface, and finish machining said inner surface while said article is guided by the contour of said outer surface.

8. A machining method for a tubular article including rough forming said article, machining inner surface of said article to finishing size by means of a non-cutting device, machining outer surface of said article to finishing size while the same is guided by the contour of said inner surface, finish machining said outer surface while said article is guided by said outer surface, and finish machining said inner surface while said article is guided by the contour of said outer surface.

9. A machining method for a tubular article including rough forming said article, machining inner surface of said article to grinding size, machining outer surface of said article to grinding size while the same is guided by the contour of said inner surface, hardening said article, finish grinding said outer surface while said article is guided by said outer surface and finish grinding said inner surface while said article is guided by the contour of said outer surface.

10. A machining method for a tubular article including rough forming said article, machining inner surface of said article, rotating said article by roller means which also contact said inner surface onto a machining guide for said article, machining outer surface of said article to grinding size while said inner surface is guided on said guide, hardening said article, and finish grinding said outer surface while said article is guided by said outer surface.

11. A machining method for a tubular article including rough forming said article, machining inner surface of said article by a non-cutting device, rotating said article by roller means which also contact said inner surface onto a machining guide for said article, machining outer surface of said article to grinding size while said inner surface is guided on said guide, hardening said article, and finish grinding said outer surface while said article is guided by said outer surface.

12. A machining method for a tubular article including rough forming said article, machining inner surface of said article to finishing size, rotating said article by roller means which also contact said inner surface onto a machining guide for said article, machining outer surface of said article to finishing size while said inner surface is guided on said guide, finish machining said outer surface while said article is guided by said outer surface, and finish machining said inner surface while said article is guided by the contour of said outer surface.

13. A machining method for a tubular article including rough forming said article, machining inner surface of said article to finishing size by means of a non-cutting device, rotating said article by roller means which also contact said inner surface onto a machining guide for said article, machining outer surface of said article to finishing size while said inner surface is guided on said guide, finish machining said outer surface while said article is guided by said outer surface, and finish machining said inner surface while said article is guided by the contour of said outer surface.

14. A machining method for a tubular article including rough forming said article, machining inner surface of said article to grinding size, rotating said article by roller means which also contact said inner surface onto a machining guide for said article, machining outer surface of said article to grinding size while said inner surface is guided on said guide, hardening said article, finish grinding said outer surface while said article is guided by said outer surface, and finish grinding said inner surface while said article is guided by the contour of said outer surface.

15. A machining method for a tubular article including rough forming said article, machining inner surface of said article to grinding size by means of a non-cutting device, rotating said article by roller means which also contact said inner surface onto a machining guide for said article, machining outer surface of said article to grinding size while said inner surface is guided on said guide, hardening said article, finish grinding said outer surface while said article is guided by said outer surface, and finish grinding said inner surface while said article is guided by the contour of said outer surface.

In testimony of the foregoing, I affix my signature.

OTTIS R. BRINEY.